US006674074B2

(12) United States Patent  
Schwartz

(10) Patent No.: US 6,674,074 B2  
(45) Date of Patent: Jan. 6, 2004

(54) ENHANCED SCANNING PROBE MICROSCOPE

(75) Inventor: Peter V. Schwartz, San Lius Obispo, CA (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/087,295

(22) Filed: Mar. 1, 2002

(65) Prior Publication Data

US 2003/0005755 A1 Jan. 9, 2003

Related U.S. Application Data

(60) Provisional application No. 60/273,183, filed on Mar. 2, 2001.

(51) Int. Cl.[7] .............................................. G12B 21/00

(52) U.S. Cl. ..................... 250/306; 250/442.11; 73/105

(58) Field of Search ............................. 250/306, 492.3, 250/442.11; 73/105

(56) References Cited

U.S. PATENT DOCUMENTS

| 5,200,616 A | 4/1993 | Kokawa et al. ............. 250/306 |
| 5,306,918 A | 4/1994 | Goudonnet et al. .... 250/442.11 |
| 5,705,814 A | 1/1998 | Young et al. ................ 250/306 |
| 5,714,756 A | 2/1998 | Park et al. ................... 250/306 |
| 6,093,930 A | 7/2000 | Boyette, Jr. et al. ......... 250/306 |

OTHER PUBLICATIONS

Piner et al., "Dip–Pen" Nanolithography; *Science;* vol. 283; 1999, pps. 661–63.

*Primary Examiner*—Jack Berman  
(74) *Attorney, Agent, or Firm*—Sheridan Ross P.C

(57) ABSTRACT

An enhanced scanning probe microscope is provided with means for controlling the atmosphere surrounding the probe tip and the sample or surface to be scanned. Additional enhancements include a tip holder which can be tuned to reflect the laser light of the apparatus on the photodiode, a brace to stabilize the optical microscope relative to the sample and a mirror placed to allow visualization of the sample and tip from the side. Also provided is an enhanced method of nanolithography using an enhanced scanning probe microscope in which it is possible to control the atmosphere surrounding the probe tip and the substrate to be patterned or etched.

12 Claims, 3 Drawing Sheets

AFM tip in tip carrier

ENHANCED SCANNING PROBE MICROSCOPE

This application claims benefit of provisional application No. 60/273,183 filed Mar. 2, 2001, the complete disclosure of which is incorporated herein by reference.

FIELD OF THE INVENTION

The invention is directed to an improved scanning probe microscope for use in scanning microscope and lithography applications.

BACKGROUND OF THE INVENTION

Scanning probe microscopes (SPMs) are a family of instruments used for studying surface properties of materials from the atomic to the micron level. The atomic force microscope (AFM) probes the surface of a sample with a sharp tip, a couple of microns long and often less than 100 Å in diameter. The tip is located at the free end of a cantilever that is typically 100 to 200 $\mu$m long. Forces between the tip and the sample surface cause the cantilever to bend, or deflect. A detector measures the cantilever deflection as the tip is scanned over the sample, or the sample is scanned under the tip. The measured cantilever deflections allow a computer to generate a map of surface topography. Several forces typically contribute to the deflection of an AFM cantilever including repulsive forces arising from interatomic forces between the cantilever and the sample and attractive van der Waals forces. Additionally, the deflection of the AFM cantilever is minimized through the feedback of the AFM.

In contact AFM mode, an AFM tip makes soft "physical contact" with the sample. The tip is attached to the end of a cantilever with a low spring constant, lower than the effective spring constant holding the atoms of the sample together. As the scanner gently traces the tip across the sample (or the sample under the tip), the contact force causes the cantilever to bend to accommodate changes in topography of the scanned sample. In AFM this means that when the cantilever pushes the tip against the sample, the cantilever bends rather than forcing the atoms of the tip closer to the atoms of the sample. Even if you design a very stiff cantilever to exert large forces on the sample, the interatomic separation between the tip and sample atoms is unlikely to decrease much. Instead, the sample surface is likely to deform.

In addition to the repulsive and attractive forces described above, two other forces are generally present during contact AFM operation: a capillary force exerted by the thin water layer often present in an ambient environment, and the force exerted by the cantilever itself. The capillary force arises due to the thickness of the meniscus, which is a function of humidity, and acts to hold the tip in contact with the surface. The magnitude of the capillary force depends upon the tip-to-sample separation. The force exerted by the cantilever is like the force of a compressed spring. The magnitude and sign (repulsive or attractive) of the cantilever force depends upon the deflection of the cantilever and upon its spring constant. As long as the tip is in contact with the sample, the capillary force should be constant because the distance between the tip and the sample is virtually incompressible assuming that the water layer is reasonably homogeneous. The variable force in contact AFM is the force exerted by the cantilever. The total force that the tip exerts on the sample is the sum of the capillary plus cantilever forces, and will be enhanced or offset by the repulsive and attractive forces discussed above. The magnitude of the total force exerted on the sample varies. Control of the surrounding atmosphere while conducting SPM is very important from a standpoint of both imaging and manipulating a scanned surface. Relative humidity, temperature and the presence of other vapors affects every day operation. Furthermore, surface manipulation techniques, such as Dip Pen Nanolithography (DPN) (R. D. Piner, J. Shu, S. Hong, C. A. Mirkin, "Dip-Pen" Nanolithography, Science, 283, 661-663, 1999), Meniscus Force Nanografting (MFN) (described in Provisional Patent Application No. 60/243,168 incorporated herein by reference in its entirety) and High Force Nanografting (HFN) (Schwartz, P. V. Langmuir (2001) 17:5971, incorporated herein by reference in its entirety) depend strongly on gas constituents, water vapor, temperature, and possibly vapors of other liquids. Thus, a need exists for a device that allows complete control over the atmospheric conditions at the SPM probe/substrate interface.

Most AFMs currently on the market detect the position of the cantilever with optical techniques. In the most common scheme, a laser beam bounces off the back of the cantilever onto a position-sensitive photodetector (PSPD). As the cantilever bends, the position of the laser beam on the detector shifts. The PSPD itself can measure displacements of light as small as 10 Å. The ratio of the path length between the cantilever and the detector to the length of the cantilever itself produces a mechanical amplification. As a result, the system can detect sub-angstrom vertical movement of the cantilever tip. In constant-force mode, the deflection of the cantilever can be used as input to a feedback circuit that moves the scanner up and down, responding to the topography by keeping the cantilever deflection constant and generating an image from the scanner's motion. Constant-force mode is generally preferred for most applications, but the laser must be reflectd from the back of the AFM cantilever onto the photodiode. Depending on the sample scanned or the cantilever used (such as twisted cantilevers), the laser may not be reflected into the sensing photodiode. Therefore, a need exists for a innovation that will allow the use of different tips and different surfaces while adjusting the AFM tip cartridge to assure the reflection of the laser from the back of the AFM cantilever onto the photodiode.

Normally an SPM is used to image a surface without damaging it in any way. However, an AFM can be used to modify the surface deliberately by applying excessive force to the tip. Nanolithography techniques are disclosed in pending application Ser. No. 09/477,997 filed Jan. 5, 2000, the complete disclosure of which is incorporated herein by reference.

All commercial SPMs now include optical microscopes to help monitor the tip-to-sample approach and to select the areas of interest on the sample surface. An optical microscope enables positioning the tip quickly and accurately, exactly where the user wishes to take an SPM image. Additionally, if the very rough or oddly shaped samples (for example geological samples) or cross sections of any kind that require landing the tip on a narrow edge are to be imaged, an optical microscope is indispensable for positioning of the cantilevered tip. However, the link between the sample stage and the objective of the optical microscope is very long, resulting in a very loose mechanical connection. The optical microscope oscillates with respect to the sample causing the image to shake and resulting captured images to be blurry. Thus, a need exists for a means that allows for much higher resolution images by preventing relative movement of between the optical microscope and the AFM stage.

Under normal operating conditions, an AFM tip may last for a couple of days, so changing the probe tip is a regular occurrence. However, the chips upon which cantilevers are mounted are very small and can be unwieldy to handle. New designs permit pre-aligned, pre-mounted probes to be changed with minimal alignment of the beam-bounce detection system although it is often still difficult to gain access to the tip. Thus, there exits a need for an easier means of gaining access to the AFM tip and cantilever.

SUMMARY OF THE INVENTION

One aspect of the present invention provides a device having a scanning probe microscope tip, a stage for holding a substrate and an atmosphere control enclosure defining an enclosed space. The atmosphere control enclosure surrounds the scanning probe microscope tip and the stage providing an enclosure in which the temperature, humidity and gas composition can be controlled.

Another aspect of the present invention provides a method of nanolithography including providing a substrate, providing a scanning probe microscope tip, and providing an atmosphere control enclosure defining an enclosed space. The tip is coated with a patterning compound and then used to apply the compound to the substrate so as to produce a desired pattern. The atmosphere control enclosure surrounds the scanning probe microscope tip and the substrate providing an enclosure in which in which the temperature, humidity and gas composition can be controlled.

Another aspect of the present invention provides an assembly for a scanning probe microscope tip having a tip cartridge, a tip carrier with a scanning probe microscope tip. The tip carrier is secured to the tip cartridge and a positioning mechanism for adjustably positioning the tip carrier in relation to the tip cartridge.

A further aspect of the present invention includes a scanning probe microscope having an optical microscope, a stage for holding a substrate and a stabilization brace. The stabilization brace is interposed between the optical microscope and the stage for holding a substrate to prevent relative movement between the optical microscope objective and the substrate.

DETAILED DESCRIPTION OF THE INVENTION

Figure 1:
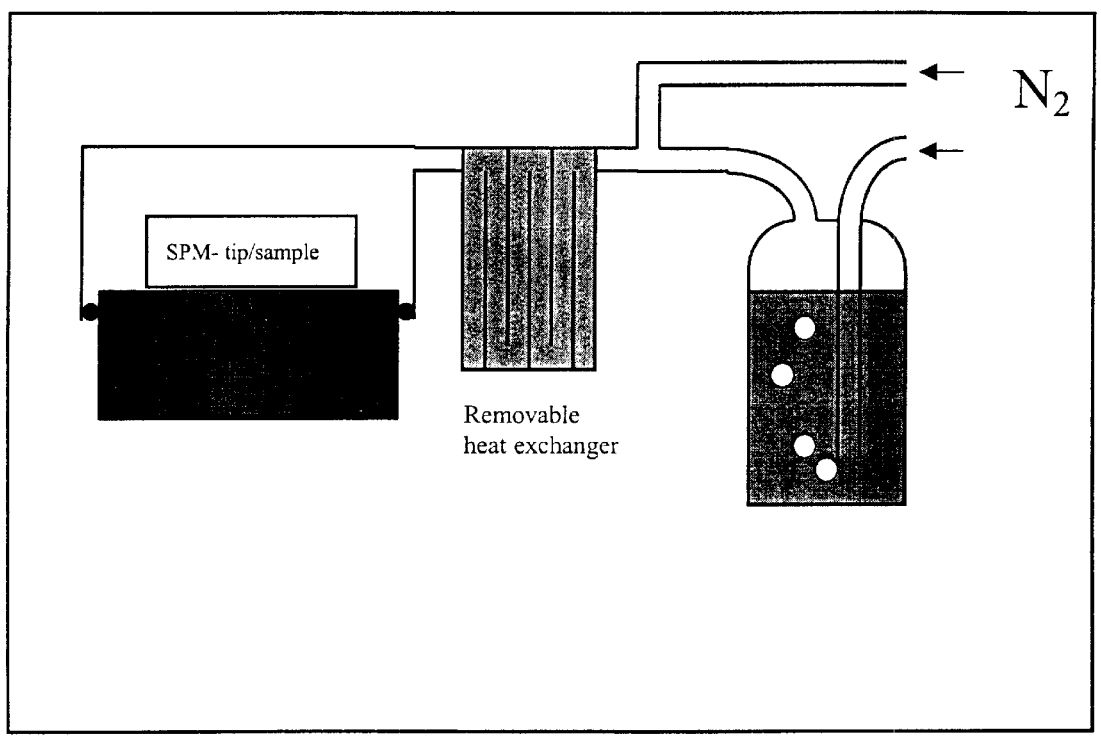
FIG. 1 shows a schematic of one embodiment of the atmosphere control enclosure including external atmosphere control means.

In an ambient environment, water wicks around the SPM tip, surrounding the tip and the sample at the point of contact with the tip. This forms a meniscus around the tip that exerts a capillary force on the tip holding the tip in contact with the sample. In this way, the presence of the this meniscus affects the resolution and speed of the scanning process. Control over the ambient environment of the tip and the sample to be scanned allows for control over the characteristics of the meniscus or even the prevention of its formation. This could be done by controlling the atmosphere of the room or enclosure containing the entire microscope, but precise control is limited in such a large space and the desired atmosphere may be toxic to researchers or prohibitively expensive to replicate on such a large scale. Therefore one embodiment of the present invention is directed to a device having a scanning probe microscope tip and a stage for the sample or substrate to be scanned enclosed in a housing allowing for control of the atmosphere immediately surrounding the SPM tip and the sample (U.S. provisional patent application No. 60/273,183, filed Mar. 2, 2001, the complete disclosure of which is incorporated herein by reference).

The scanning probe microscope tip is an extremely fine probe tip resembling a stylus that is attached to one end of a cantilever with a triangular projection that rides just above or on the surface of the sample being scanned. The tip is brought into the vicinity of the sample surface via a coarse positioning system controlling the position of the cantilever to which the tip is attached. The tip can be made of many different materials but is often metal. The tip rides above or along the surface of the sample or substrate being scanned, moving under the control of a piezoelectric scanner which moves the sample under the tip or the tip over the sample, usually in a raster pattern. In the field of nanolithography, the tip is moved under the control of a computer to precisely write or etch the desired shape. Movement of the tip is recorded by a position-sensitive photodetector (PSPD). Laser light is shown on the back or top of the tip and reflected onto the surface of the PSPD. As the tip moves up and down over the surface of the sample or substrate, the vertical position of the tip is "sensed" by the PSPD as the laser light reflected off of the top of the cantilevered tip thereby moving the reflected light across the PSPD in relation to the vertical movement of the tip. By controlling the angle of the laser light reflected off of the tip, an amplification of the movement of the tip is recorded by the PSPD.

The stage is the surface on which the sample is rested or affixed. In some SPM techniques, the sample or substrate to be scanned or etched by the tip is moved under the tip. In this case, an external computer system or similar means controls movement of the stage while the tip is held fixed, thereby moving the sample under the tip. The stage may also be attached to a positioning device to further control positioning or contact between the tip and the sample. The stage may be smooth or rough depending upon the sample to be positioned there and may include means to fix or hold the sample in place during the scan or etch by the tip. It is the close proximity of the tip and the surface of the sample that creates capillary force between the tip and the sample which, under ambient conditions, draws atmospheric water into the gap and creates a meniscus which then surrounds the tip and extends to contact the sample surface.

The atmosphere control enclosure defines an enclosed space surrounding the cantilevered tip and the substrate. The enclosure may have one or more openings connected to a means of controlling the atmosphere within the enclosure. Alternatively, the atmosphere control means may be entirely encased within the enclosure. An example would include a dessicant contained entirely within the enclosure. In this case, the enclosure may have no external openings to external atmosphere control means. Using the attached atmosphere control means, the gas content, temperature and humidity can be controlled individually or simultaneously within the enclosure. Atmosphere control means include but are not limited to heaters, coolers, gas supplies, humidifiers, dehumidifiers and monitoring devices to monitor the atmosphere in the enclosure and/or the atmosphere entering or leaving the enclosure.

Different gasses can be used to purge the enclosure thereby replacing the air surrounding the sample and the tip. Any desired gas can be used as long as it is compatible with the tip, the substrate and the enclosure materials. The gas may also be bubbled through a solvent of choice or mixed with other gasses as it is fed into the enclosure. The use of different gasses including inert gasses is particularly useful for nanolithograhy applications in which coatings to the substrate or the tip may react deleteriously with oxygen. Additionally, the ability to simultaneously control the humidity in the enclosure during these applications allows control over the meniscus formed, if any, between the tip and the sample or substrate.

In one embodiment of the invention, a small housing is fitted around the stage of the microscope and made airtight by means of a seal between an adapter ring and the round base of the enclosure. Gas is fed into the housing and can be expelled through another opening or via the base of the stage, as the user desires.

A schematic of one embodiment of the atmosphere control enclosure is shown in FIG. 1. The temperature of the atmosphere, and thus ultimately, the AFM can also be controlled via a removable heat exchanger. The top of the enclosure is transparent, flexible silicone rubber. It is useful for the top to be transparent so that the experimenter can see the sample during sample manipulation. It is also important that the top be flexible so that the optical microscope objective can move relative to the sample. Plexiglas® fulfills the requirement of transparency. A suitable flexible material for the top of the enclosure is transparent silicon rubber. Many other materials which are inert to the atmosphere introduced and controlled within the container will be apparent to the skilled artisan. An airtight seal is maintained between the top of the enclosure and the microscope objective by means of an "O"-ring attachment. This arrangement enables the full use of the optical microscope without hindrance of any additional surfaces between the objective and sample.

Mechanical feedthroughs allow the experimenter to manipulate the sample, adjust the photodiode position, move the AFM head and, in some newer AFM models, allow the laser position to be adjusted. The number of feedthroughs available on the enclosure is limited only by the surface area of the enclosure and the space needed within the enclosure to perform the scanning or nanolithography techniques. Preferably, the front panel is easily removed via thumbscrews, allowing the quick removal of the sample and exchange of AFM tips. The enclosure does not encumber experimental activities. In fact, certain adjustments are facilitated by the enclosure's presence. In one embodiment, feedthroughs are made by securing nipples from baby bottles to the sides of the enclosure. In another embodiment, a humidity probe is inserted through the back of the enclosure via an "O"-ring.

The small size of the enclosure allows for complete exchange of atmospheric gases in a very short time, having well under 10% of the volume of a conventional glovebox. Preferably, the internal volume is less than 5 liters and more preferably the volume is less than 3 liters. It is also very easy to install and remove the enclosure and the SPM is actually easier to control via the mechanical feedthroughs than it is to manipulate without the enclosure in place. By allowing for complete control over the atmosphere surrounding the tip and sample, the enclosure allows for increased experimental reproducibility by perfectly replicating atmospheric conditions and allowing these processes to be optimized.

DPN is a nanolithography technique by which molecules are directly transported to a substrate of interest in a positive printing mode. DPN utilizes a solid substrate as the "paper" and a scanning probe microscope (SPM) tip (e.g., an atomic force microscope (AFM) tip or a near field scanning optical microscope (NSOM) tip) as the "pen." The tip is coated with a patterning compound (the "ink"), and the coated tip is used to apply the patterning compound to the substrate to produce a desired pattern. DPN enjoys numerous advantages for depositing "nanoscale" wide mono- or multilayer molecules. The DPN delivery mechanism may involve the formation of a meniscus around the SPM tip and the control of the movement of the patterning molecules to the surfaces on which they are deposited by a driving force. Considerable recent work done in this area demonstrates the efficacy of the DPN approach to pattern monolayer molecules at the lateral width as small as 10 nm, DPN is described in pending application Ser. No. 09/477,997, filed Jan. 5, 2000, the complete disclosure of which is incorporated herein by reference.

Meniscus Force Nanografting (MFN) is a variation of Thin Film Nanografting in which the a patterning material is applied as a thin film on a resist-covered substrate, and an AFM tip selectively penetrates the resist, delivering the patterning material to the substrate. In MFN, surface tension of the liquid film itself can supply the constant force necessary to displace the resist molecules thereby eliminating the need for AFM feedback control.

The meniscus that is formed in these techniques affects DPN, MFN and HFN in predictable ways and is subject to variations in the relative humidity as well as chemical interactions between the solvent and the substrate. The meniscus may also affect the rate of the transport of the patterning compound to the substrate. This may require coating of the microscope tip with hydrophobic compounds if the nanolithography is to be performed in air. Solubility characteristics of the "ink" molecules in a given solvent can create difficulty in establishing a desired line width and a suitable loading concentration of the ink in the solvent. Furthermore, surface tension characteristics of different solvents can lead to drip or rapid flow from the pen leading to problems with precise control of the ink application under some circumstances. Accordingly, one embodiment of the present invention provides a method of nanolithography in which a scanning probe microscope tip is used to transfer a patterning compound from the tip to the substrate within the atmosphere controlled enclosure described above. In this way, the meniscus that forms between the tip and the substrate is controlled or even eliminated, thereby allowing additional control over the meniscus and therefore the pattern formed.

Any patterning compound can be used, provided it is capable of transferring to the substrate to modify the substrate to form stable surface structures. Stable surface structures are formed by chemisorption or physisorption of the molecules of the deposition compound onto the substrate or by covalent linkage of the molecules of the patterning compound to the substrate. Useful compounds include magnetic particles or biomolecules such as proteins, peptides, polypeptides, nucleotides, polynucleotides, nucleic acids and synthetic organic compounds. Additionally, biomolecules bound, adsorbed or absorbed to magnetic particles are particularly useful.

This method of nanolithography can be used to prepare many different patterns including arrays and including combinatorial arrays. An "array" is an arrangement of a plurality of discrete sample areas in a pattern on a substrate. The sample areas may be any shape (e.g., dots, circles, squares or triangles) and may be arranged in any pattern (e.g., rows and columns of discrete sample areas). Each sample area may contain the same or a different sample as contained in the other sample areas of the array. A "combinatorial array" is an array wherein each sample area or a small group of replicate sample areas (usually 2-4) contain(s) a sample which is different than that found in other sample areas of the array. A "sample" is a material or combination of materials to be studied, identified, reacted, etc.

This technique will be particularly useful for the preparation of arrays on the submicrometer scale. An "array on the submicrometer scale" means that at least one of the dimensions (e.g, length, width or diameter) of the sample areas, excluding the depth, is less than 1 μm. At present, the technique can be used to prepare lines that are about 2 to about 10 nm in width. Arrays on a submicrometer scale allow for faster reaction times and the use of less reagents than the currently-used microscale (i.e., having dimensions, other than depth, which are 1-999 μm) and larger arrays. Also, more information can be gained per unit area (i.e., the arrays are more dense than the currently-used micrometer scale arrays). Finally, the use of submicrometer arrays provides new opportunities for screening. For instance, such arrays can be screened with scanning probe microscopes to look for physical changes in the patterns (e.g., shape, stickiness, height) and/or to identify chemicals present in the sample areas, including sequencing of nucleic acids.

Each sample area of an array contains a single sample. For instance, the sample may be a biological material, such as a nucleic acid (e.g., an oligonucleotide, DNA, or RNA), protein or peptide (e.g., an antibody or an enzyme), ligand (e.g. an antigen, enzyme substrate, receptor or the ligand for a receptor), or a combination or mixture of biological materials (e.g., a mixture of proteins). Such materials may be attached directly on a desired substrate or each sample area may contain a compound attached for capturing the biological material. See, e.g, PCT applications WO 00/04382, WO 00/04389 and WO 00/04390, the complete disclosures of which are incorporated herein by reference. For instance, patterning compounds terminating in certain functional groups (e.g., —COOH) can bind proteins through a functional group present on, or added to, the protein (e.g., —NH$_2$). Also, it has been reported that polylysine, which can be attached to the substrate as described above, promotes the binding of cells to substrates. See James et al., *Langmuir*, 14, 741-744 (1998). It has further been reported that cells bind to octadecanethiol-coated surfaces. As another example, each sample area may contain a chemical compound (organic, inorganic and composite materials) or a mixture of chemical compounds. Chemical compounds may be deposited directly on the substrate or may be attached through a functional group present on a deposition compound present in the sample area. From the foregoing, those skilled in the art will recognize that a deposition compound may comprise a sample or may be used to capture a sample.

The use of an SPM requires a laser to be reflected from the back of the AFM cantilever, and detected by a photodiode. The movable photodiode array must be centered on the reflected laser beam, the position of which depends on the orientation of the back of the cantilever. However, the cantilever is often twisted at such an angle that the reflected laser is outside the range of the diode array and the cantilever is thereby rendered useless. This is particularly problematic when time is spent coating the tip, especially for certain nanolithography techniques such as Dip Pen Nanolighography, requiring recurrent movement and "loading" of the tips with patterning inks. The coating and subsequent drying process, often twists the cantilevers. Additionally, SPM tips are often bent because of aging, or coating, and usually must be discarded.

The assembly for a SPM tip includes a tip cartridge clipped or otherwise attached to a tip carrier. Static means such as glass beads are often inserted between the tip cartridge and tip carrier to hold the cantilevered tip attached to the tip carrier in a position angled away from the tip cartridge. Changing or otherwise manually manipulating the tip is accomplished by removing the tip carrier from the tip cartridge by unclipping or otherwise detaching the tip carrier. Replacement with a new tip attached to a tip carrier will not place the new tip in the identical orientation it was in with respect to the tip cartridge and the laser-photodiode arrangement.

Figure 2:
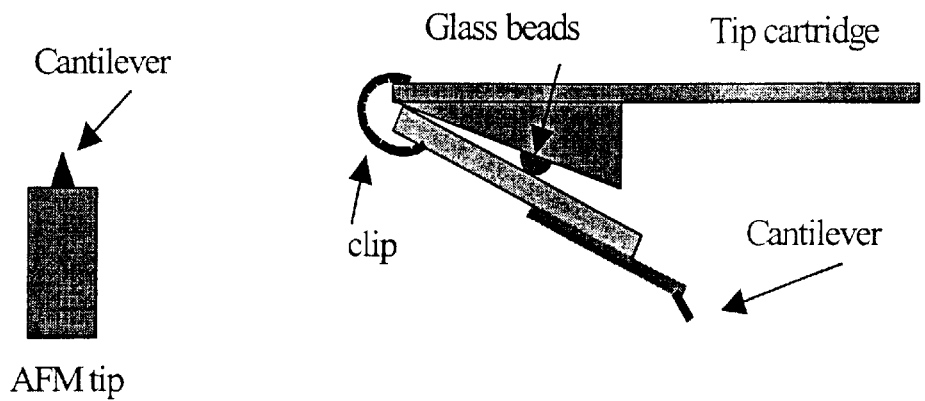
FIG. 2 shows the prior art design of a SPM tip carrier secured to a cartridge by means of a clip.
Figure 3:
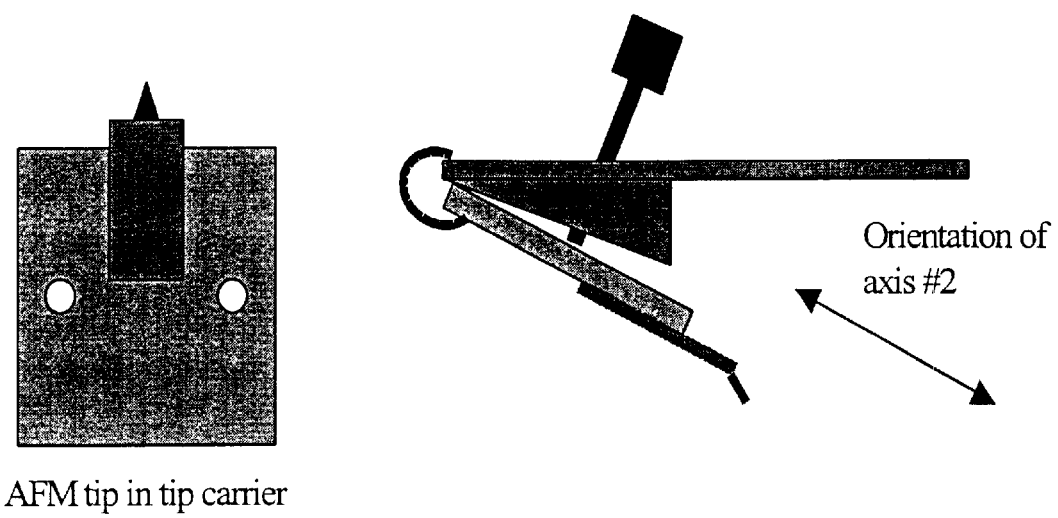
FIG. 3 shows a SPM tip carrier of the present invention having screws threaded through the tip cartridge allowing for the tuning of the tip.

Therefore, one embodiment of the present invention is a tunable tip holder applicable to all SPM needs. FIG. 2 shows the prior art design of a SPM tip carrier secured to a cartridge by means of a clip and two glass beads fit into the holes of the tip carrier. The glass beads are used to ensure proper carrier position of the cantilever. As the glass beads cannot be adjusted in any way however, the position of the cantilever cannot be tuned to overcome deviations in the positioning of the cantilever caused by events including twisting or bending of the cantilever, coating, cracking or drying of the tip. FIG. 3 shows one embodiment of the present invention in which the glass beads of the prior art are replaced with one or more screws threaded through the tip cartridge allowing for the tuning of the tip or adjustment of the angle of the tip relative to the tip cartridge. Adjustment of the screws controls the orientation of the cantilever surface about both axes perpendicular to the line of sight to the photodiode array. In a preferred embodiment of the present invention, two screws are used which allows for additional tuning of the SPM tip in the tip carrier by allowing the position of the tip carrier to be rotated about the axis perpendicular to the plane of the diagram when the screws are turned in the same direction and about a second axis #2, as shown in FIG. 3, when the screws are turned in opposite directions. This allows the reflected laser to be directed to the photodiode after the cantilever has been twisted. This not only saves money by saving SPM tips that would otherwise be discarded, but saves an enormous amount of valuable time in experimental execution and preparation—especially when tips are subject to any kind of modification such as coating.

A SPM includes an optical microscope objective positioned above the tip and the sample holder that allows the user to position the tip near the sample or substrate prior to beginning the scanning or lithography techniques. The optical microscope enables positioning the tip quickly and accurately. The link between the sample stage and the objective of the optical microscope is very long, resulting in a very loose mechanical connection causing vibration and oscillation of the optical microscope objective with respect to the sample causing the image to shake and blur. Therefore, one embodiment of the present invention is a brace that can be inserted between the optical microscope and the AFM stage, which prevents their relative movement. The brace is wedged between the AFM stage and the horizontal arm of the optical microscope supporting the objective piece of the optical microscope. It prevents relative movement of the microscope objective and the sample, thus stabilizing the images of the substrate on the video monitor.

The brace allows for the capture of much higher resolution images from the monitor. The brace must be composed of a rigid material such as metal or lexan but the skilled artisan will recognize that any rigid material that can be formed to fit the instrument as a brace and sufficiently stiff to brace the optical microscope objective relative to the sample holder can be used. Preferably, the stabilization brace is removable allowing the user to clean or otherwise manipulate the tip and sample stage area of the SPM without interference from the brace and during AFM imaging in order to mechanically isolate the AFM stage from the optical microscope.

Figure 4:
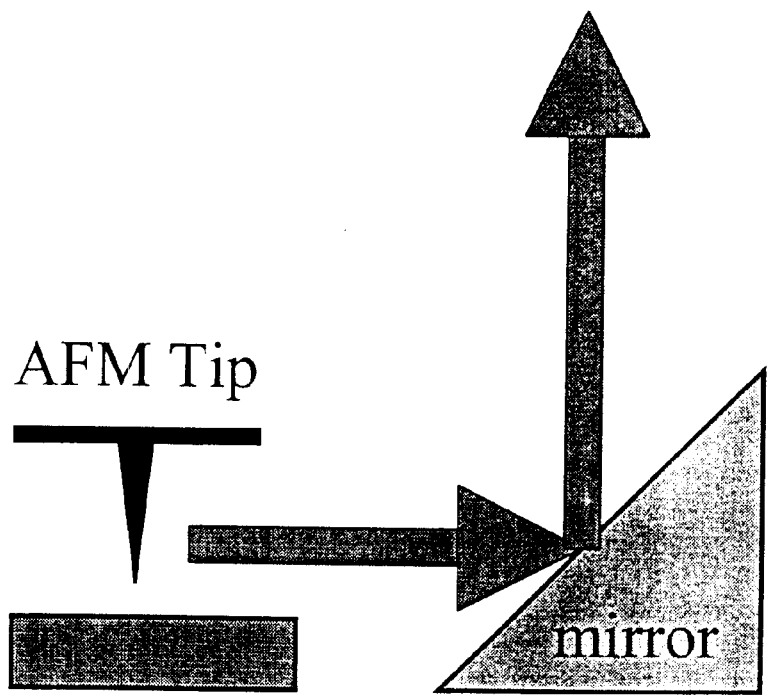
FIG. 4 shows a schematic of the SPM of the present invention having a mirror placed directly below the objective of the optical microscope and directly to one side of the sample and tip.

The position of the optical microscope objective above the tip and sample can make it difficult to properly align the tip near the sample for some applications. For this reason, one embodiment of the present application is a small right angle mirror for the optical microscope that allows the sample or tip to be viewed from the side. FIG. 4 shows a schematic of one embodiment of the present invention in which the mirror is placed directly below the objective of the optical microscope and directly to one side of the sample and/or tip. The view through the optical microscope can then be adjusted to focus on the reflection of the side view of the sample and the tip reflected in the mirror. This makes is much easier to align the tip on or near the sample or substrate for some scanning or lithography applications.

It is to be noted that the term "a" or "an" entity refers to one or more of that entity, including mixtures of the entities of two or more of the entities. As such, the terms "a" (or "an"), "one or more" and "at least one" are used interchangeably herein. It is also to be noted that the terms "comprising," "including," and "having" have been used interchangeably.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A device, comprising:
a scanning probe microscope tip;
a stage for holding a substrate; and
an optical microscope objective; and
an atmosphere control enclosure defining an enclosed space, wherein said atmosphere control enclosure surrounds said scanning probe microscope tip and said stage and wherein said atmosphere control enclosure comprises a top of flexible material having an airtight seal between said flexible top and said optical microscope objective.

2. The device of claim 1, wherein said atmosphere control enclosure at least partially comprises a transparent material.

3. The device of claim 1, wherein said atmosphere control enclosure further comprises at least one opening for communicating with an atmosphere control apparatus and wherein said atmosphere control apparatus controls at least one atmospheric parameter selected from the group consisting of temperature, relative humidity and gas composition.

4. The device of claim 1, wherein said atmosphere control enclosure further comprises at least one mechanical feedthrough.

5. A method of nanolithography comprising:
providing a substrate;
providing a scanning probe microscope tip;
providing an atmosphere control enclosure defining an enclosed space, wherein said atmosphere control enclosure surrounds said scanning probe microscope tip and said substrate and wherein said atmosphere control enclosure comprises a flexible top having an airtight seal between said flexible silicon rubber top and an optical microscope objective;
coating the tip with a patterning compound; and
using the coated tip to apply the compound to the substrate so as to produce a desired pattern.

6. The method of claim 5, wherein said atmosphere control enclosure at least partially comprises a transparent material.

7. The method of claim 5, wherein said atmosphere control enclosure further comprises at least one opening for communicating with an atmosphere control apparatus and wherein said atmosphere control apparatus controls at least one atmospheric parameter selected from the group consisting of temperature, relative humidity and gas composition.

8. The method of claim 5, wherein said atmosphere control enclosure further comprises at least one mechanical feedthrough.

9. A scanning probe microscope, comprising
an optical microscope;
a stage for holding a substrate; and
a stabilization brace, wherein said stabilization brace is interposed between said optical microscope and said stage for holding a substrate to prevent relative movement therebetween.

10. The scanning probe microscope of claim 9, wherein said stabilization brace comprises a rigid material.

11. The scanning probe microscope of claim 9, wherein said stabilization brace is removable.

12. A scanning probe microscope, comprising:
a) a scanning probe microscope tip;
b) a stage for holding a substrate;
c) an optical microscope having an objective;
d) an atmosphere control enclosure defining an enclosed space, wherein said atmosphere control enclosure surrounds said scanning probe microscope tip and said stage and wherein said atmosphere control enclosure comprises at least one opening for communicating with an atmosphere control apparatus;
e) an assembly for said scanning probe microscope tip, comprising:
(i) a tip cartridge;
(ii) a tip carrier, comprising said scanning probe microscope tip, wherein said tip carrier is secured to said tip cartridge; and
(iii) a positioning mechanism for adjustably positioning said tip carrier in relation to said tip cartridge;
f) a stabilization brace, wherein said stabilization brace is interposed between said optical microscope and said stage for holding a substrate to prevent relative movement therebetween; and
g) a mirror positioned horizontally displaced from said scanning probe microscope tip and vertically aligned with said objective of said optical microscope to reflect a side image of said scanning probe microscope tip toward said objective.

* * * * *

UNITED STATES PATENT AND TRADEMARK OFFICE
CERTIFICATE OF CORRECTION

PATENT NO. : 6,674,074 B2
DATED : January 6, 2004
INVENTOR(S) : Schwartz

It is certified that error appears in the above-identified patent and that said Letters Patent is hereby corrected as shown below:

Column 1,
Line 7, please insert the following paragraph:

STATEMENT REGARDING FEDERALLY SUPPORTED RESEARCH AND DEVELOPMENT
    This invention was made in part with Government support under Grant Number F49620-99-1-0071 awarded by the Air Force Office of Scientific Research (AFOSR). The Government has certain rights in the invention.

Signed and Sealed this

Fifth Day of October, 2004

JON W. DUDAS
*Director of the United States Patent and Trademark Office*